United States Patent
Sundaresan et al.

(10) Patent No.: US 9,450,654 B2
(45) Date of Patent: Sep. 20, 2016

(54) MULTI-USER MULTIPLE INPUT MULTIPLE OUTPUT (MIMO) COMMUNICATION WITH DISTRIBUTED ANTENNA SYSTEMS IN WIRELESS NETWORKS

(71) Applicant: NEC Laboratories America, Inc., Princeton, NJ (US)

(72) Inventors: Karthikeyan Sundaresan, Howell, NJ (US); Mohammad Khojastepour, Lawrenceville, NJ (US); Sampath Rangarajan, Bridgewater, NJ (US); Jie Xiong, Princeton, NJ (US)

(73) Assignee: NEC Corporation (JP)

(*) Notice: Subject to any disclaimer, the term of this patent is extended or adjusted under 35 U.S.C. 154(b) by 203 days.

(21) Appl. No.: 14/333,245

(22) Filed: Jul. 16, 2014

(65) Prior Publication Data

US 2015/0023248 A1    Jan. 22, 2015

Related U.S. Application Data

(60) Provisional application No. 61/856,604, filed on Jul. 19, 2013, provisional application No. 61/949,418, filed on Mar. 7, 2014.

(51) Int. Cl.
| | |
|---|---|
| *H04B 7/04* | (2006.01) |
| *H04B 7/02* | (2006.01) |
| *H04B 7/06* | (2006.01) |
| *H04L 5/00* | (2006.01) |
| *H04W 64/00* | (2009.01) |

(52) U.S. Cl.
CPC ............ *H04B 7/0452* (2013.01); *H04B 7/024* (2013.01); *H04B 7/0443* (2013.01); *H04B 7/0456* (2013.01); *H04B 7/0617* (2013.01); *H04B 7/0691* (2013.01); *H04L 5/006* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 6,148,211 | A * | 11/2000 | Reed | H04W 64/00 455/456.2 |
| 2014/0133417 | A1* | 5/2014 | Ariyavisitakul | H04B 7/0626 370/329 |

OTHER PUBLICATIONS

Rahul, H., et al. "MegaMIMO: Scaling Wireless Capacity with User Demands" SIGCOMM'12. Aug. 2012. (12 Pages).

* cited by examiner

*Primary Examiner* — Vinncelas Louis
(74) *Attorney, Agent, or Firm* — Joseph Kolodka

(57) ABSTRACT

A system and a method are provided. The method includes deploying a plurality of antennas of an access point or a base station as a distributed antenna system. The method further includes configuring the distributed antenna system for multi-user wireless transmissions by applying medium access techniques and power-balanced pre-coding at the access point or the base station. The method also includes providing device localization for devices communicating with the distributed antenna system by applying time-difference-of-arrival techniques to antenna pairs from among the plurality of antennas at the access point or the base station.

18 Claims, 5 Drawing Sheets

MULTI-USER MULTIPLE INPUT MULTIPLE OUTPUT (MIMO) COMMUNICATION WITH DISTRIBUTED ANTENNA SYSTEMS IN WIRELESS NETWORKS

RELATED APPLICATION INFORMATION

This application claims priority to provisional application Ser. No. 61/856,604 filed on Jul. 19, 2013, incorporated herein by reference. This application also claims priority to provisional application Ser. No. 61/949,418 filed on Mar. 7, 2014, incorporated herein by reference.

BACKGROUND

1. Technical Field

The present invention relates to signal processing, and more particularly to multi-user multiple input multiple output (MU-MIMO) communication with distributed antenna systems in wireless networks.

2. Description of the Related Art

Next generation wireless networks (WiFi 802.11ac, LTE) are adopting sophisticated wireless transmission strategies like multi-user MIMO (MU-MIMO) for increase spectral efficiency. However, the access points (APs) and base stations (BSs) are deployed with all their antennas co-located. While such co-located antenna systems (CAS) are good for single user communication, they are highly in-efficient for multi-user communications like MU-MIMO and significantly limit the performance of the latter.

Current solutions attempt to improve the transmission strategy while still retaining the CAS model of antenna deployment at the APs/BSs. Hence, the improvement to MU-MIMO schemes is limited. Further, they do not account for the per-antenna power constraint required for a practical implementation of MU-MIMO transmission schemes.

SUMMARY

These and other drawbacks and disadvantages of the prior art are addressed by the present principles, which are directed to multi-user multiple input multiple output (MU-MIMO) communication with distributed antenna systems in wireless networks.

According to an aspect of the present principles, a method is provided. The method includes deploying a plurality of antennas of an access point or a base station as a distributed antenna system. The method further includes configuring the distributed antenna system for multi-user wireless transmissions by applying medium access techniques and power-balanced pre-coding at the access point or the base station. The method also includes providing device localization for devices communicating with the distributed antenna system by applying time-difference-of-arrival techniques to antenna pairs from among the plurality of antennas at the access point or the base station.

According to another aspect of the present principles, a system is provided. The system includes an access point or a base station. The access point or base station includes a plurality of antennas deployed as a distributed antenna system. The access point or base station further includes a pre-coder for performing power-balanced pre-coding. The access point or base station also includes a device localizer for providing device localization for devices communicating with the distributed antenna system by applying time-difference-of-arrival techniques to antenna pairs from among the plurality of antennas. The plurality of antennas are configured for multi-user wireless transmissions by applying medium access techniques and the power-balanced pre-coding.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
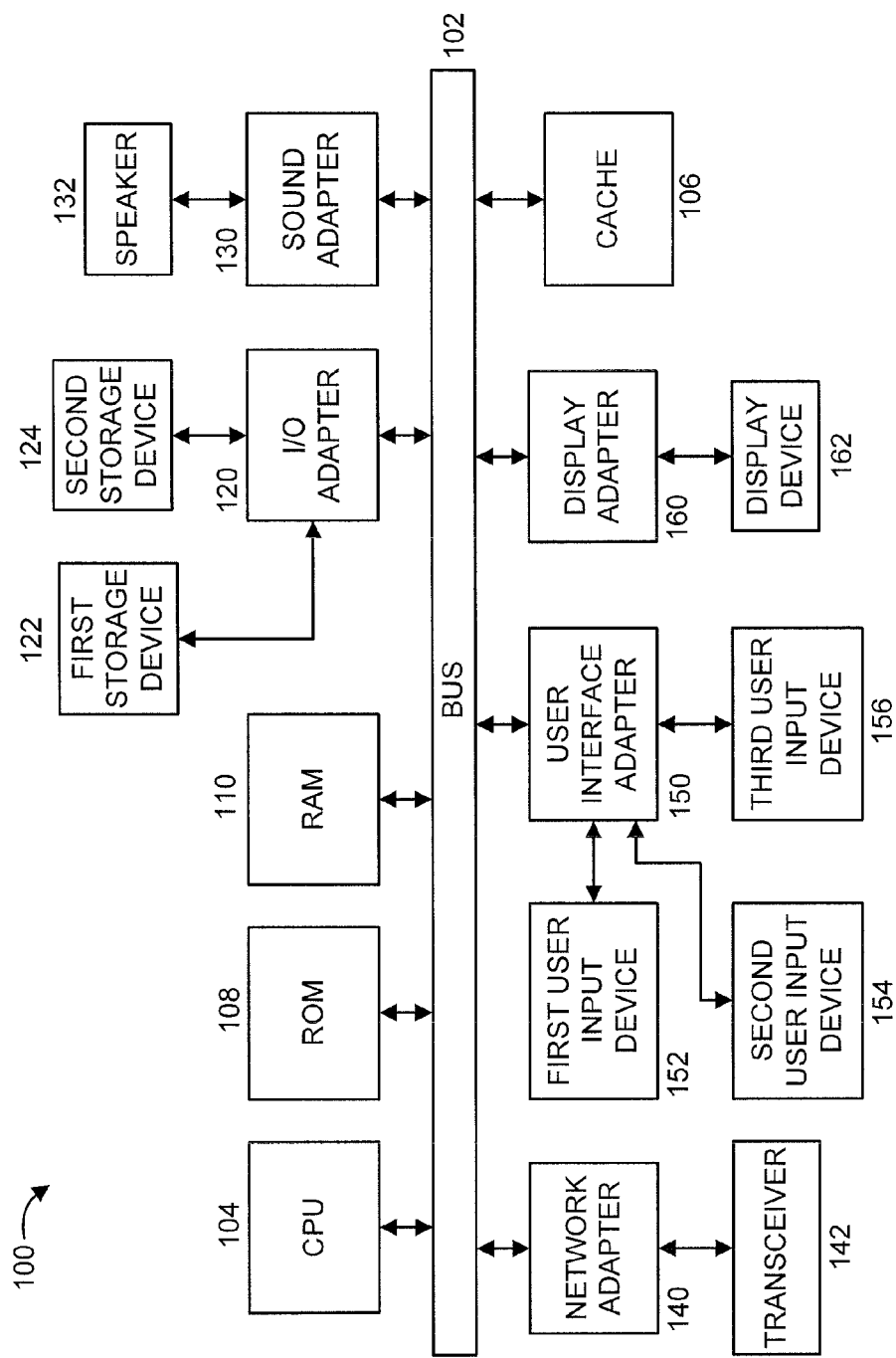
FIG. 1 is a block diagram illustrating an exemplary processing system 100 to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operative coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles.

The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
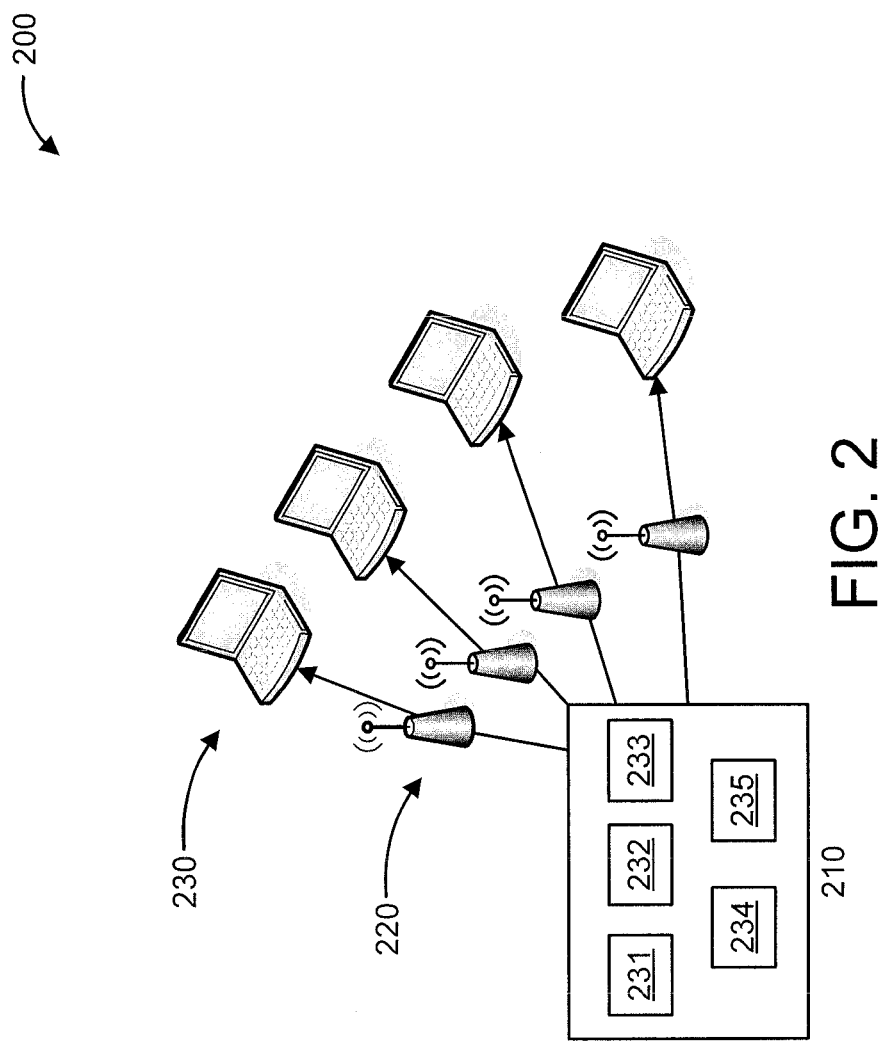
FIG. 2 shows an exemplary system 200 for multi-user multiple input multiple output (MU-MIMO) communication with a distributed antenna system in a wireless network, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
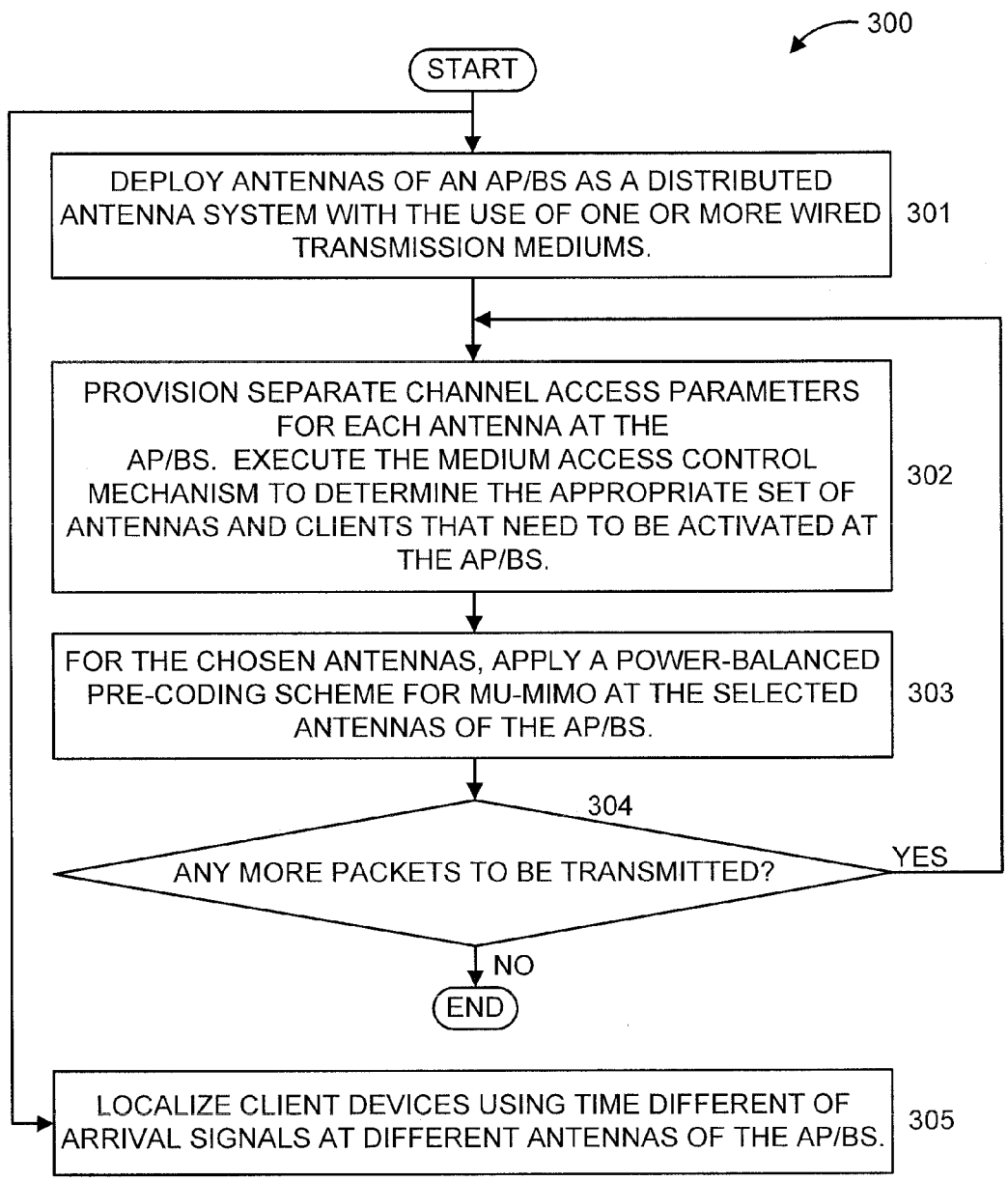
FIG. 3 shows an exemplary method 300 for multi-user multiple input multiple output (MU-MIMO) communication with distributed antenna systems in wireless networks, according to an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for multi-user multiple input multiple output (MU-MIMO) communication with a distributed antenna system in a wireless network, in accordance with an embodiment of the present principles. System 200 includes an access point 210 having a set of antennas 220 configured/deployed as a distributed antenna system. The antennas 220 interface with a set of clients 230. The access point includes a pre-coder 231, a device localizer 232, an opportunistic antenna adder 233, a packet tagger 234, and a packet scheduler 235.

The pre-coder 231 performs power-balanced pre-coding. The device localizer 232 provides device localization for devices communicating with the distributed antenna system by applying time-difference-of-arrival techniques to antenna pairs from among the set of antennas. The set of antennas 220 is configured for multi-user wireless transmissions by applying medium access techniques and the power-balanced pre-coding. The opportunistic antenna adder 233 opportunistically adds antennas to a wireless transmission. The packet tagger 234 tags packets for the wireless transmission to indicate transfer using a subset of preferred antennas from among the set of antennas. The packet scheduler 235 schedules packets for wireless transmission. Scheduling can be performed responsive to, for example, but not limited to, a fairness parameter.

The present principles employ a distributed antenna system (DAS) model to deploy the antennas of an AP/BS. The AP/BS's antennas are distributed around the location of the AP, separated by several meters/feet with the help of a wired transmission medium such as radio frequency (RF) extension cables, optical fibers, and so forth. In an embodiment, the present principles include a new wireless transmission technique and medium access control mechanism that enables multi-user transmissions (MU-MIMO) over the DAS deployment of the APs/BSs, thereby resulting in a multiple input distributed antenna system (MIDAS). The latter significantly improves the performance of multi-user transmissions and also enables accurate indoor localization of client devices.

It is to be appreciated that one significant difference the present principles provide is the introduction of MIDAS (multiple-input distributed antenna systems) compared to prior art single input DAS and multiple input co-located antenna systems, as well as the benefits MIDAS bring to both multi-user communications and device localization.

A competitive value of the present principles involves taking existing wireless technologies that support multi-user transmission over CAS systems and turning them into multiple input DAS systems, along with improved transmission and medium access mechanisms to leverage the benefits of the DAS deployment for multi-user transmissions. The result is that the performance of multi-user transmissions and network capacity is significantly improved with the help of light-weight, low complexity solutions without additional expenses in infrastructure deployment. It also enables accurate indoor localization of client devices.

FIG. 3 shows an exemplary method 300 for multi-user multiple input multiple output (MU-MIMO) communication with distributed antenna systems in wireless networks, according to an embodiment of the present principles. Initially, the method 300 proceeds to both step 301 and step 305, with step 301 thereafter continuing onto step 302.

At step 301, deploy the antennas of an AP/BS as a distributed antenna system with the use of one or more wired transmission mediums including, but not limited to, radio frequency (RF) extension cables, optical fibers, coaxial cables, and so forth.

At step 302, provision separate channel access parameters for each antenna at the AP/BS. Execute a medium access control mechanism to determine the appropriate set of antennas and clients that need to be activated at the AP/BS.

At step 303, for the chosen clients antennas, apply a power-balanced pre-coding scheme for MU-MIMO at the selected antennas of the AP/BS.

At step 304, determine whether there are any more packets to be transmitted at the AP/BS. If so, return to step 302. Otherwise, the method is terminated.

At step 305, localize client devices using time difference of arrival of signals at different antennas of the AP/BS. In an embodiment, step 305 can involve using multiple pairs of antennas at the AP/BS to increase the accuracy of device localization.

Figure 4:
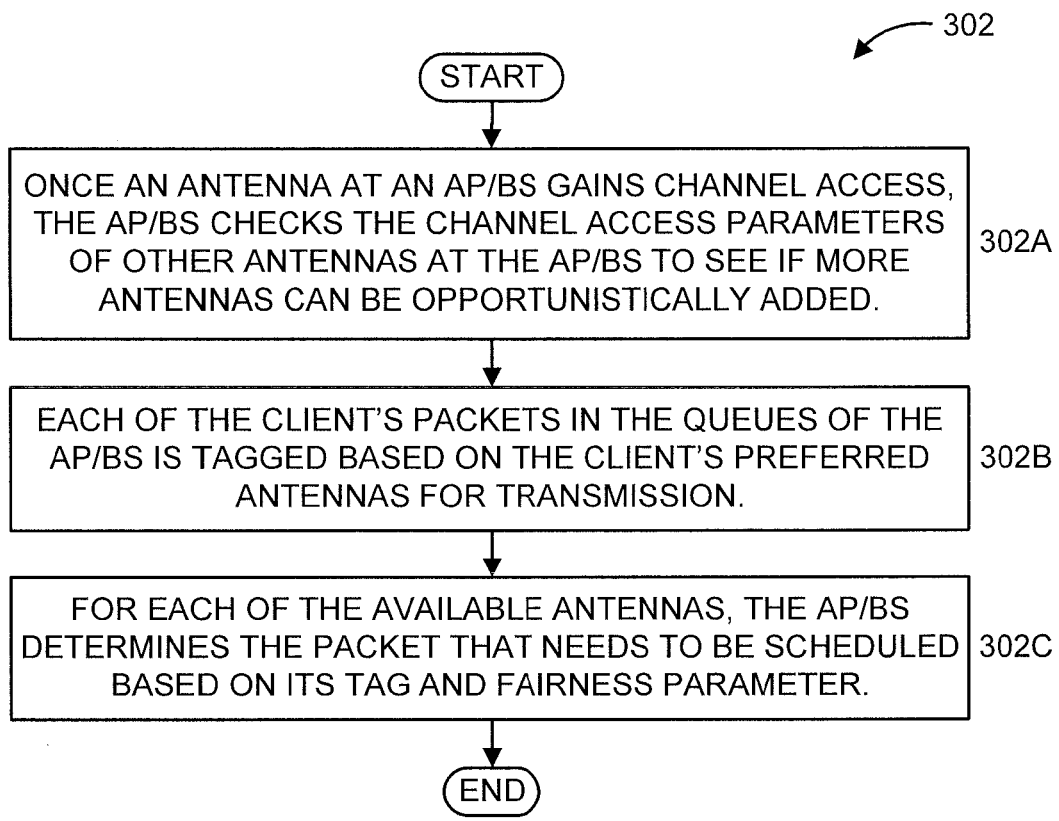
FIG. 4 further shows step 302 of method 300 of FIG. 3, according to an embodiment of the present principles.

FIG. 4 further shows step 302 of method 300 of FIG. 3, according to an embodiment of the present principles.

At step 302A, once an antenna at an AP/BS gains channel access, the AP/BS checks the channel access parameters (e.g., network allocation vectors in WiFi) of other antennas at the AP/BS to see if more antennas can be opportunistically added to the wireless transmission.

At step 302B, each of the client's packets in the AP/BS's queues is tagged based on the client's preferred antennas (one or more in number) for transmission. In an embodiment, preferred antennas for a client could be chosen based on, for example, but not limited to, signal strength and/or some other metric(s).

At step 302C, for each available antenna (e.g., n antennas), the AP/BS determines the packet (client) that needs to be scheduled based on both its tag and fairness parameter. In an embodiment, the antennas are considered in order of their channel access parameters (e.g., WiFi NAV timer expiry) and a different client is chosen by each antenna.

Figure 5:
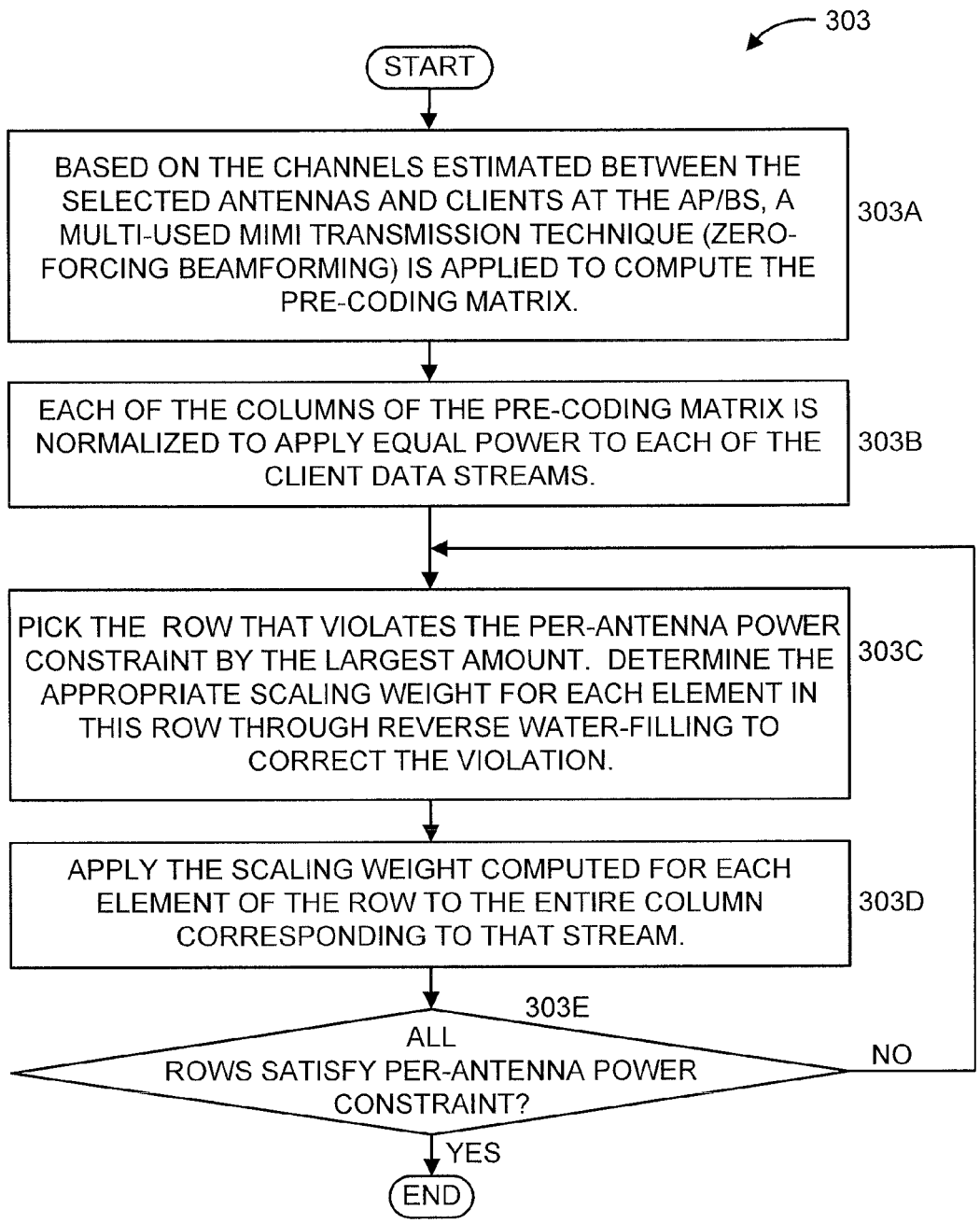
FIG. 5 further shows step 303 of method 300 of FIG. 3, according to an embodiment of the present principles.

FIG. 5 further shows step 303 of method 300 of FIG. 3, according to an embodiment of the present principles.

At step 303A, based on the channels estimated between the selected antennas and clients at the AP/BS, a multi-user MIMO transmission technique called zero-forcing beamforming is applied to compute the pre-coding matrix V. In an embodiment, the latter can be used to encode the data signals that are transmitted from the selected antennas jointly to the clients so as to remove their mutual interference.

At step 303B, each of the columns of the pre-coding matrix V is normalized to apply equal power to each of the client data streams.

At step 303C, pick the row (AP antenna, k) that violates the per-antenna power constraint by the largest amount. Determine the appropriate scaling weight ($w_j$) for each element (client) in this row through reverse water-filling to correct the violation.

In an embodiment, step 303C can further include the following. The scaling weights are determined as $$w_j = \sqrt{\frac{1}{\lambda v_{kj}^2} - \frac{1}{\rho_j}},$$

where $v_{kj}$ is the element in the k-th row and j-th column of the pre-coding matrix V, $\lambda$ is the common power level required to overcome the violation and restore the per-antenna power constraint and is determined through optimization, and $\rho_j$ is the SNR of the j-th stream (client). In an embodiment, both $\lambda$ and $w_j$ are obtained simultaneously from formulating the reverse water filling problem mathematically.

At step 303D, apply the scaling weight ($w_j$) computed for each element ($v_{kj}$) of this row (k) to the entire column corresponding to that stream (i.e., $v_{kj} \rightarrow w_j v_{kj}$, for all k, j).

At step 303E, determine whether or not all rows satisfy the per-antenna constraint. If so, then the result is power-balanced pre-coding at the AP/BS, and the method returns to step 303C. Otherwise, the method proceeds to step 304.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method, comprising:
   deploying a plurality of antennas of an access point (AP) or a base station (BS) as a distributed antenna system;
   provisioning separate channel access parameters for each of the plurality of antennas at the AP or BS;
   configuring the distributed antenna system for multi-user wireless transmissions by applying medium access techniques and power-balanced pre-coding at the access point or the base station to determine an appropriate set of antennas and clients to be activated at the AP or BS, wherein the pre-coding comprises:
   computing a pre-coding matrix for a wireless transmission of a plurality of client packets, the precoding matrix including a plurality of columns and a plurality of rows, selecting a given row, from among the plurality of rows, violating a per-antenna power constraint by a largest amount, and
   determining a scaling weight for each element in the given row using a reverse water-filling technique to correct the violation; and
   tagging each of a client's packets in AP or BS queues based on the client's preferred set of antennas from the appropriate set of antennas, wherein the preferred set of antennas is selected based on at least one of signal strength or antenna type;
   determine a client packet to schedule based on its tag and fairness parameter, wherein the appropriate set of antennas for selection are considered in order of their channel access parameters, and wherein a different client is selected by each of the appropriate set of antennas; and
   providing device localization for devices communicating with the distributed antenna system by applying time-difference-of-arrival techniques to antenna pairs from among the appropriate set of antennas at the access point or the base station.

2. The method of claim 1, responsive to one of the plurality of antennas at the access point or the base station obtaining a channel access for a wireless transmission and further responsive to values of channel access parameters of other ones of the plurality of antennas at the access point or the base station, opportunistically adding one or more of the other ones of the plurality of antennas to the wireless transmission.

3. The method of claim 2, wherein each of a plurality of packets for the wireless transmission is tagged for transfer using a subset of the preferred set of antennas from among the appropriate set of antennas.

4. The method of claim 2, wherein each of a plurality of packets is scheduled for the wireless transmission responsive to a fairness parameter.

5. The method of claim 4, wherein different ones of the plurality of packets are chosen for the wireless transmission by different ones of the appropriate set of antennas, responsive to an antenna ordering based on the channel access parameters.

6. The method of claim 1, further comprising applying the scaling weight determined for each element in the given row to an entire one of the plurality of columns of the pre-coding matrix.

7. The method of claim 1, wherein the pre-coding matrix is computed using zero-forcing beamforming.

8. The method of claim 1, wherein each of the plurality of columns of the preceding matrix is initially normalized to apply equal power to each client data stream.

9. The method of claim 1, wherein the scaling weight is determined as $$w_j = \sqrt{\frac{1}{\lambda v_{kj}^2} - \frac{1}{\rho_j}},$$

where $v_{kj}$ is an element in a k-th row from among the plurality of rows and a j-th column from among the plurality of columns, $\lambda$ is a common power level required to restore the per-antenna power constraint and is determined through optimization, and $\rho_j$ is the signal-to-noise ratio of a j-th stream.

10. A system, comprising:
an access point (AP) or a base station (BS), wherein the access point AP or base station BS includes:
a plurality of antennas deployed as a distributed antenna system, wherein separate channel access parameters are provisioned for each of the plurality of antennas at the AP or BS;
a pre-coder for performing power-balanced pre-coding to determine an appropriate set of antennas and clients to be activated at the AP or BS, wherein the precoding comprises:
computing a pre-coding matrix for a wireless transmission of a plurality of client packets, the precoding matrix including a plurality of columns and a plurality of rows,
selecting a given row, from among the plurality of rows, violating a per-antenna power constraint by a largest amount, and
determining a scaling weight for each element in the given row using a reverse water-filling technique to correct the violation; and
a packet tagger for tagging each of a client's packets in AP or BS queues based on the client's preferred set of antennas from the appropriate set of antennas,
wherein the preferred set of antennas is selected based on at least one of signal strength or antenna type,
wherein a client packet to schedule is selected based on its tag and fairness parameter, and
wherein a different client is selected by each of the appropriate set of the antennas; and
a device localizer for providing device localization for devices communicating with the distributed antenna system by applying time-difference-of arrival-techniques to antenna pairs from among the appropriate set of antennas,
wherein the appropriate set of antennas are configured for multi-user wireless transmissions by applying medium access techniques and the power-balanced pre-coding.

11. The system of claim 10, further comprising an opportunistic antenna adder for opportunistically adding one or more of other ones of the plurality of antennas to the wireless transmission, responsive to one of the plurality of antennas obtaining a channel access for a wireless transmission and further responsive to values of channel access parameters of other ones of the plurality of antennas.

12. The system of claim 11, further comprising the packet tagger for tagging each of a plurality of packets for the wireless transmission to indicate transfer using a subset of the preferred set of antennas from among the appropriate set of antennas.

13. The system of claim 11, further comprising a packet scheduler for scheduling each of a plurality of packets for the wireless transmission responsive to a fairness parameter.

14. The system of claim 13, wherein different ones of the plurality of packets are chosen for the wireless transmission by different ones of the appropriate set of antennas, responsive to an antenna ordering based on the channel access parameters.

15. The system of claim 10, wherein said pre-coder applies the scaling weight determined for each element in the given row to an entire one of the plurality of columns of the pre-coding matrix.

16. The system of claim 10, wherein the pre-coder computes the precoding matrix using zero-forcing beamforming.

17. The method of claim 10, wherein each of the plurality of columns of the precoding matrix is initially normalized to apply equal power to each client data stream.

18. The system of claim 10, wherein the scaling weight is determined as $$w_j = \sqrt{\frac{1}{\lambda v_{kj}^2} - \frac{1}{\rho_j}},$$

where $v_{kj}$ is an element in a k-th row from among the plurality of rows and a j-th column from among the plurality of columns, $\lambda$ is a common power level required to restore the per-antenna power constraint and is determined through optimization, and $\rho_j$ is the signal-to-noise ratio of a j-th stream.

* * * * *